United States Patent

[11] 3,607,916

| [72] | Inventors | Naoya Kominami;<br>Kusuo Kawarazaki; Masao Hashinaga, all of Tokyo, Japan |
|---|---|---|
| [21] | Appl. No. | 596,414 |
| [22] | Filed | Nov. 23, 1966 |
| [45] | Patented | Sept. 21, 1971 |
| [73] | Assignee | Asahi Kasei Kogyo Kabushiki Kaisha<br>Osaka, Japan |
| [32] | Priority | Dec. 17, 1965 |
| [33] | | Japan |
| [31] | | 40/77525 |

[54] PROCESS FOR PRODUCING VINYL ACETATE
2 Claims, No Drawings

[52] U.S. Cl. ........................................................ 260/497 A,
260/604 AC
[51] Int. Cl. ........................................................ C07c 67/04
[50] Field of Search ........................................... 260/497 A,
597 B, 604 AC

[56] References Cited
UNITED STATES PATENTS

| 3,121,673 | 2/1964 | Riemenschneider et al.. | 260/597 |
|---|---|---|---|
| 3,118,001 | 1/1964 | Riemenschneider et al.. | 260/597 |

FOREIGN PATENTS

| 618,071 | 9/1962 | Belgium ....................... | 260/497 |

OTHER REFERENCES

Moisecv et al., Proc. Head. of Sci., U.S.S.R., July, 1960 pp. 801–804.

*Primary Examiner*—James A. Patten
*Assistant Examiner*—Vivian Garner
*Attorney*—Stevens, Davis, Miller and Mosher

ABSTRACT: The production of vinyl acetate by passing ethylene and oxygen through acetic acid in the presence of a catalyst comprising a noble metal and a promoter metal, wherein catalyst activity is maintained by including a small amount of mono-, di- or trichloracetic acid or salts thereof.

PROCESS FOR PRODUCING VINYL ACETATE

This invention relates to a process for producing vinyl acetate by liquid phase flow reaction of ethylene, acetic acid and oxygen as starting materials without any important decrease in catalyst activity.

The synthesis of vinyl acetate may be effected by subjecting a gaseous mixture consisting of ethylene, acetic acid and oxygen to a vapor phase reaction in the presence of catalyst composition comprising at least one of metals of platinum, palladium, ruthenium, rhodium and iridium as a main catalyst component, and at least one of metals of copper, silver, zinc, cadmium, tin, lead, chromium, molybdenum, tungsten, iron, cobalt and nickel as a promoter.

However, it has been found that, when a catalyst system comprising acetates of above-mentioned metals is used as a catalyst in a liquid phase flow reaction of ethylene, acetic acid and oxygen, the catalyst activity tends to remarkably decrease during a reaction period unlike in the vapor phase reaction. Although it is still possible to practise the process mentioned above commercially even with the use of catalyst system having such tendency to decrease in activity, the method involves the provision of equipment and operations for regenerating catalyst. Moreover, the loss of catalyst in the regeneration operation is disadvantageous from the economic point of view since these catalysts are very expensive.

It is, therefore, an object of this invention to provide a process for producing vinyl acetate from ethylene, acetic acid, and oxygen using a liquid phase flow method, efficiently and economically, without any important decrease in catalyst activity.

The mechanism of decrease in activity of the catalyst system as mentioned above in a liquid phase reaction has been thoroughly investigated. As a result, it has now been found that such decrease is caused by the separation of metals contained in the main catalyst component. Processes for preventing separation of metals as described above have been extensively investigated and it has been discovered that, if such catalyst is dissolved in acetic acid containing at least one of mono-, di-, or trichloro-acetic acids and a gaseous mixture consisting of ethylene and oxygen is passed therethrough, vinyl acetate may be successfully synthesized without any important decrease in catalyst activity and the products thus obtained consist mainly of vinyl acetate and acetaldehyde and no vinyl esters of these chloroacetic acids are produced at all.

This is extremely surprising in view of the prevailing theory that the vinyl ester corresponding to carboxylic acid used is usually formed by passing a gaseous mixture consisting of ethylene and oxygen through a solution of the above-mentioned catalyst in the carboxylic acid.

In the past, we had discovered that the presence of a small amount of hydrogen chloride in the gaseous reactant mixture comprising ethylene, acetic acid and oxygen may prevent the decrease in catalyst activity in a vapor phase reaction of said reactants in the presence of the above-mentioned catalyst system. However, chlorides of these metals mentioned above show not only the extremely poor solubility in acetic acid but also the catalyst activity is too low, though a tendency to decrease in the activity is not observed. Thus, they are not used in a actual liquid phase reaction from an economical point of view. Hence, when using these metal chlorides as catalyst, it has been necessary to incorporate an additive such as sodium acetate or a solvent such as dimethylformamide to the reaction system thereby increasing the solubility of catalysts to enhance the catalyst activity thereof.

On the other hand, in the process of this invention, the synthesis of vinyl acetate can be accomplished economically without using any solvent such as dimethylformamide and the like, since the solubility in acetic acid of a compound obtained from chloroacetic acid and above-mentioned metals is quite large.

Thus, in accordance with this invention, there is provided a process for producing vinyl acetate in a liquid phase flow reaction by passing ethylene and oxygen or an oxygen-containing gas through acetic acid containing at least one of oxides, hydroxides or salts, which readily give corresponding acetates upon reacting with acetic acid, of metals of platinum, palladium, ruthenium, rhodium and iridium, and at least on of metallic copper, silver, zinc, cadmium, tin, lead, chromium, molybdenum, tungsten, iron, cobalt and nickel, and oxides, hydroxides and salts which readily give corresponding acetates upon reacting with acetic acid, thereof, characterized in that said reaction is carried in the presence of a small amount of at least one of mono-, di-, and trichloroacetic acids.

In accordance with this invention, the decrease in the catalyst activity can be successfully prevented and the life of catalyst may be very greatly prolonged. Hence, the process of this invention enables the economical and efficient production of vinyl acetate on an industrial scale without requiring any special equipment and operations for regenerating catalyst, free from any important loss of catalyst, without requiring any solvent due to a larger solubility of the catalyst in acetic acid, and in an improved yield per unit weight of catalyst employed.

In practicing the process of this invention, the amount of to be employed is preferably from 100 to 1,000 mol percent based on the total mols of the main catalyst component and the promoter used. If the amount of chloroacetic acids is less than specified as above, a decrease in catalyst activity may be observed. Adversely, if the amount exceeds the range mentioned above, not only the sum of one-through yields of vinyl acetate and acetaldehyde per unit of weight of main catalyst component is decreased but also the ratio of vinyl acetate to acetaldehyde becomes smaller, thus it is undesirable from the economical point of view.

These chloroacetic acids may be added in the forms of free acids or chloroacetates of the metals of the main catalyst component and the promoter. Alternatively, they may also be added as a metal salt such as sodium chloroacetate or the like which is soluble in acetic acid.

Catalysts which may be used in the process of this invention are redox catalysts consisting of at least one of oxides, hydroxides and salts such as acetates, chlorides, mono-, di-, and trichloroacetates, cyanides and the like of metals of platinum, palladium, rhodium, ruthenium and iridium, and at least one of metallic copper, silver, zinc, cadmium, tin, lead, chromium, molybdenum, tungsten, iron, cobalt and nickel, and hydroxides and salts, such as acetates chlorides, mono-, di-, triacetates, carbonates, bicarbonates, cyanides and the like, thereof.

The proportion of promoter to the main catalyst component which may be employed in the process of this invention is preferably more than 1:1, and most preferably more than 5:1 in atomic ratio.

The addition of metal salts of acetic acid such as sodium acetate, potassium acetate and the like to the above-mentioned catalyst system gives no adverse effect to the reaction but leads to a desirable result.

In practicing process of invention, a reaction temperature of from 60° to 150° is preferable. If the reaction temperature is lower than specified above, the reaction rate is decreased, while, a higher temperature induces more side reactions and leads to a decrease in selectivity of vinyl acetate.

Also, no particular range of molar ratio of oxygen to ethylene is required for the initiation of reaction in practicing the process of this invention. However, in general, a molar ratio of oxygen to ethylene is preferably more than 1:1.

The pressure at which the gaseous reactant is passed through the reaction solution may be varied within a wide range. However, in general, a pressure of from normal to 50 atmospheres is preferred due to the fact that superatmospheric pressures increase the solubilities of ethylene and oxygen in acetic acid and thus increase the reaction rate.

This invention may further be explained in the following examples. HOwever, it should not be construed that these examples restrict this invention as are given merely by way of illustration.

EXAMPLE 1

50 ml. of a dehydrated acetic acid containing 0.5 m.mol of palladium acetate, 10 m.mol of copper acetate and 25 m.mol of sodium monochloroacetate was heated at 100° C. and a gaseous mixture was passed therethrough at a constant pressure and a rate of 6 liter per an hour. Said gaseous mixture consisted of 30 percent of ethylene and 70 percent of oxygen. The reaction was carried out maintaining the solution at a volume of 50 ml. by replenishing required amount of acetic acid via a metering pump.

The reaction products were all subjected to gas chromatographic analysis and one-through yields of acetate and acetoaldehyde per unit weight of ethylene were measured. The results obtained after 5 hours from the starting of the reaction were 1.8 percent and 2.5 percent, respectively, and the results remained identical after 100 hours from the starting of reaction.

EXAMPLE 2

In 50 ml. of acetic acid containing 80 m.mol of dichloroacetic acid were suspended 1 m.mol of palladium oxide and 30 m. mol of powdered iron, and the resulting suspension was heated at 110° C. for about an hour while feeding oxygen thereto. Thereafter, a gaseous mixture consisting of 20 percent of ethylene and 80 percent of oxygen was passed therethrough at a constant pressure and a rate of 3 liter per an hour. One-through yields of vinyl acetate and acetaldehyde after 3 hours from the starting of the reaction were 3.4 percent and 6.7 percent, respectively.

EXAMPLE 3

In 50 ml. of acetic acid containing 30 m.mol of monochloroacetic acid were dissolved 1.0 m.mol of palladium trichloroacetate and 15 m.mol of nickel carbonate and the resulting solution was heated at 80° C. Thereafter, a gaseous mixture consisting of 10 percent of ethylene and 90 percent of air was passed therethrough at a pressure of 5 atmospheres and a rate of 10 1/hr. One-through yields of vinyl acetate and acetaldehyde were 1.1 percent and 3.0 percent, respectively.

EXAMPLE 4

In a small amount of were dissolved 5 m.mol or rhodium chloride and 50 m.mol of chromium chloride and the resulting solution was neutralized by adding an aqueous sodium carbonate solution thereto until an alkaline condition was reached and the precipitate formed was filtered and washed. In 200 ml. of acetic acid having dissolved therein 150 m.mol of sodium monochloroacetate was suspended the precipitate thus obtained and, while the suspension was heated at 100° C., a gaseous mixture consisting of 30 percent of ethylene and 70 percent of oxygen was passed therethrough at a pressure of 3 atmospheres and a rate 45 1/hr.

After 3 hours from the starting of the reaction a steady condition was reached and one-through yields of vinyl acetate and acetaldehyde at that time were 2.4 percent and 3.3 percent, respectively.

EXAMPLE 5

In a small amount of water was dissolved 1 m.mol or ruthenium chloride and the resulting solution was neutralized by adding an aqueous sodium carbonate solution thereto until an alkaline condition was reached and the precipitate formed was filtered and washed. In 100 ml. of acetic acid containing 200 m.mol of trichloroacetic acid and 50 m.mol of lead acetate was suspended the precipitate thus obtained and, while the suspension was heated at 100° C., a gaseous mixture consisting of 30 percent of ethylene and 70 percent of was passed therethrough at a normal pressure an a rate 6 1/hr. One-through yields of vinyl acetate and acetaldehyde after 5 hours from the starting of the reaction were 2.1 percent and 3.7 percent, respectively.

Said experiment was repeated except that tin acetate was used in place of lead acetate. One-through yields of vinyl acetate and acetaldehyde after 5 hours from the starting of the reaction were 2.4 percent and 2.9 percent, respectively.

EXAMPLE 6

1 m.mol of iridium chloride and 12 m.mol of zinc chloride were dissolved in a small amount of water and zinc hydroxide was produced according to the same procedure as described in example 4. In 50 ml. of acetic acid containing 100 m.mol of monochloroacetic acid was suspended hydroxide obtained as above and while suspension was heated at 100° C., a gaseous mixture consisting of 20 percent of ethylene and 80 percent of oxygen in a molar ratio was passed therethrough at a pressure of 10 atmospheres and a rate of 30 1 /hr. One-through yields of vinyl acetate and acetaldehyde were 1.9 percent and 4.4 percent, respectively.

The experiment was repeated according to the same procedures as described above, except that cadmium chloride was substituted for zinc chloride.

As a result, one-through yields of vinyl acetate and acetaldehyde were 1.6 percent and 4.3 percent, respectively.

EXAMPLE 7

Through 50 ml. of acetic acid containing 0.5 m.mol of palladium chloride, 5 m.mol of copper acetate, 5 m.mol of tungsten oxide, 20 m.mol of sodium acetate and 20 m.mol of monochloroacetic acid was passed a gaseous mixture consisting of 20 percent of ethylene and 80 percent of oxygen in molar ratio, at 100° C. and a rate 8 1/hr. One-through yields of vinyl acetate and acetaldehyde were 2.1 percent and 3.0 percent, respectively.

The experiment was repeated according to the same procedures as described above except that molybdenum oxide was substituted for tungsten oxide. As a result, one-through yields of vinyl acetate and acetaldehyde were 2.3 percent and 3.1 percent, respectively.

EXAMPLE 8

Through 50 ml. of acetic acid containing 0.5 m.mol of platinum chloride, 10 m.mol of cobalt cyanide, 50 m.mol of monochloroacetic acid and 50 m.mol of sodium acetate was passed a gaseous mixture consisting of 30 percent of ethylene and 70 percent of oxygen in molar ratio, at a rate of 5 1/hr., at 110° C.

The catalyst activity was increased until after 7 hours from the starting of the reaction and reached a steady condition thereafter.

One-through yields of vinyl acetate and acetaldehyde at the steady condition were 0.7 percent and 1.1 percent, respectively.

EXAMPLE 9

Through 50 ml. of acetic acid containing 1 m.mol of palladium hydroxide, 15 m.mol of silver oxide and 50 m.mol of sodium monochloroacetate was passed a gaseous mixture consisting of 10 percent of ethylene and 90 percent of oxygen in molar ratio at a rate of 4 1/hr, at 105° C.

One-through yields of vinyl acetate and acetaldehyde at a steady condition were 2.6 percent and 5.0 percent, respectively.

What we claim is:

1. Process for producing vinyl acetate by a liquid phase flow reaction which comprises passing ethylene and a gas comprising oxygen through acetic acid containing at least one member selected from the group consisting of mono-, di- and trichloroacetic acid and sodium salts thereof in the presence of a main catalyst component comprising at least one member selected from the group consisting of oxides, hydroxides, chlorides, acetates, mono-, di- and trichloroacetates and cyanides of platinum, palladium, ruthenium, rhodium and iridium, and at least one promoter selected from the group consisting of metallic copper, silver, zinc, cadmium, tin, lead, chromium, molybdenum, tungsten, iron, cobalt and nickel, and oxides, hydroxides, acetates, mono-, di- and trichloroacetates, carbonates, bicarbonates, cyanides and chlorides, said member being used in an amount of 100 to 1,000 mol percent based on the total mols of the main catalyst component and the promoter, and the reaction temperature being from 60° C. to 150° C.

2. Process according to claim 1 wherein the proportion of promoter to the main catalyst component is more than 1:1.